S. FELDMAN.
APPARATUS FOR MANUFACTURING BOXES OF CARTON BLANKS.
APPLICATION FILED SEPT. 5, 1918.
1,294,076.
Patented Feb. 11, 1919.
4 SHEETS—SHEET 1.
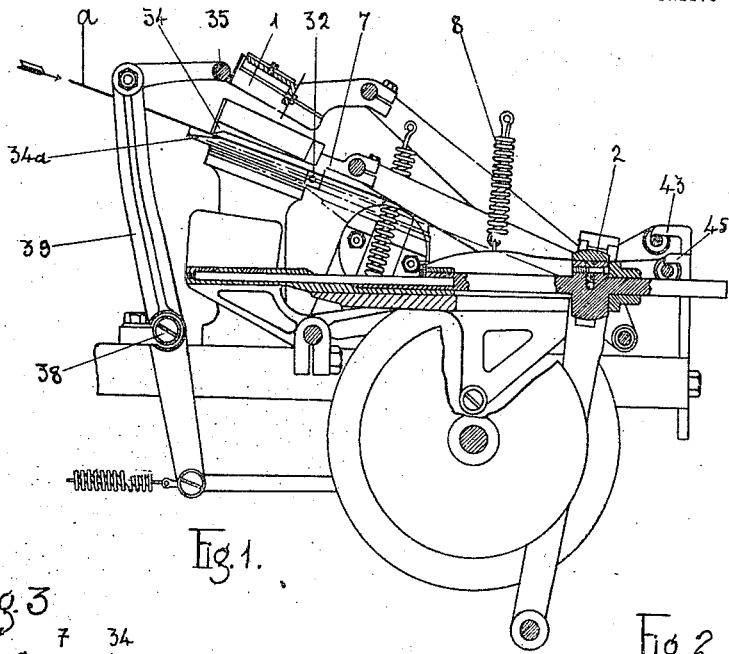
Fig. 1.
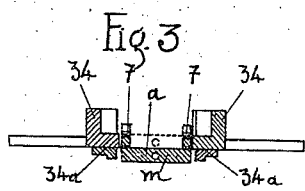
Fig. 3.
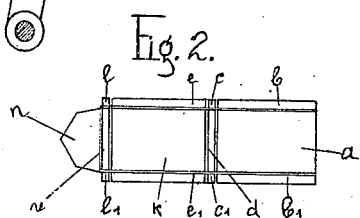
Fig. 2.
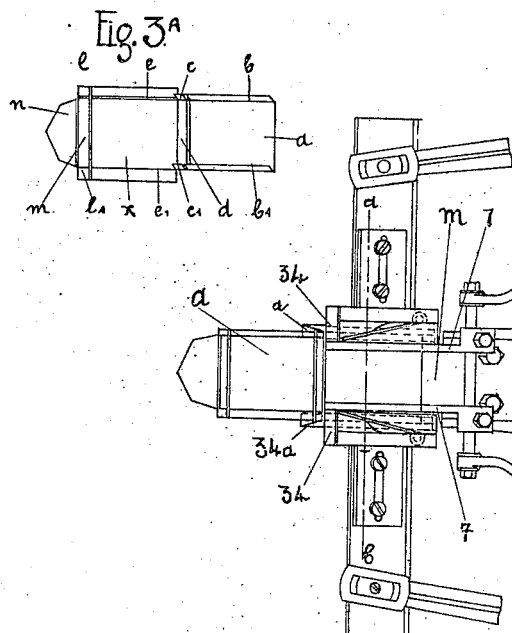
Fig. 3ᴬ
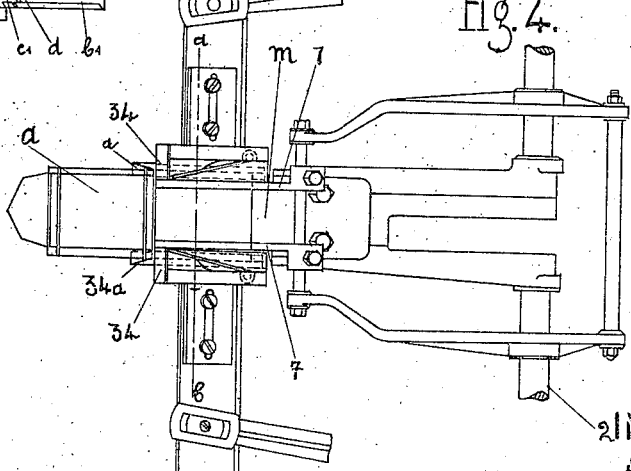
Fig. 4.
INVENTOR
S. Feldman
BY H. R. Kerslake
ATTORNEY

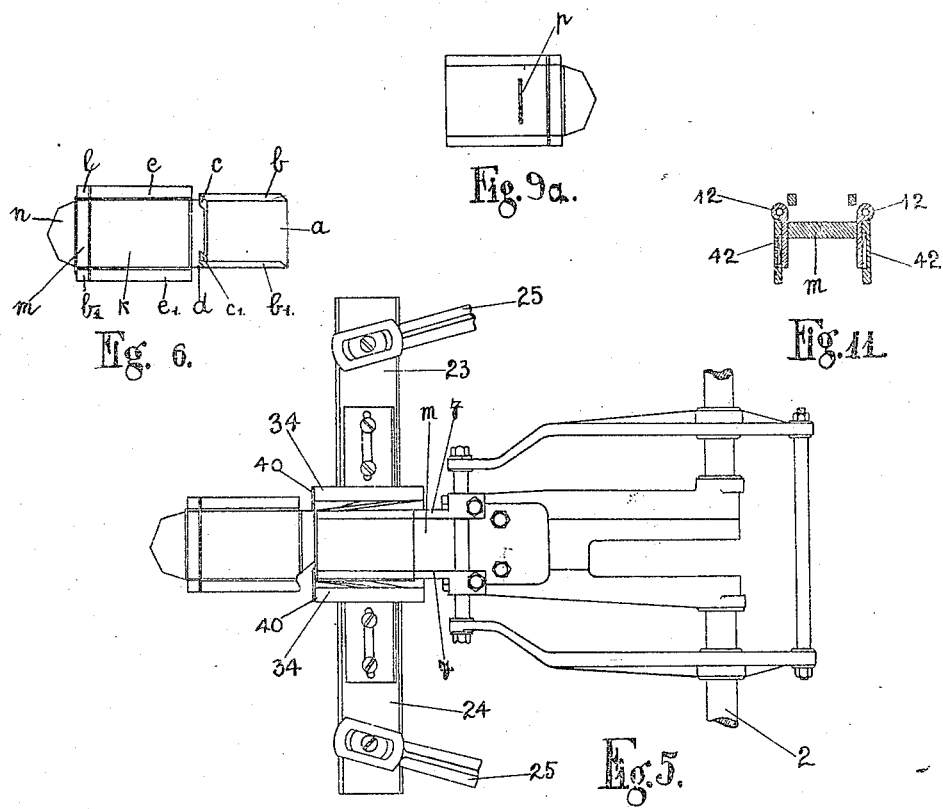

S. FELDMAN.
APPARATUS FOR MANUFACTURING BOXES OF CARTON BLANKS.
APPLICATION FILED SEPT. 5, 1918.

1,294,076.

Patented Feb. 11, 1919.
4 SHEETS—SHEET 3.

INVENTOR
S. Feldman.
BY H. R. Kerslake
ATTORNEY

S. FELDMAN.
APPARATUS FOR MANUFACTURING BOXES OF CARTON BLANKS.
APPLICATION FILED SEPT. 5, 1918.

1,294,076.

Patented Feb. 11, 1919.
4 SHEETS—SHEET 4.

INVENTOR
S. Feldman
BY H. R. Kerslake
ATTORNEY

UNITED STATES PATENT OFFICE.

SHIMON FELDMAN, OF PETROGRAD, RUSSIA, ASSIGNOR TO J. M. AIVAZ SOCIETE PAR ACTION POUR CONSTRUCTION DE MACHINES, OF PETROGRAD, RUSSIA.

APPARATUS FOR MANUFACTURING BOXES OF CARTON-BLANKS.

1,294,076.   Specification of Letters Patent.   Patented Feb. 11, 1919.

Application filed September 5, 1918. Serial No. 252,809.

*To all whom it may concern:*

Be it known that I, SHIMON FELDMAN, a citizen of Russia, and residing at Petrograd, Russia, have invented certain new and useful Improvements in Apparatus for Manufacturing Boxes of Carton-Blanks, of which the following is a specification.

In Russian patent application No. 66063 an apparatus for manufacturing carton boxes is described consisting of a system of forming blocks rotating on a common axle and serving for making boxes upon them, said blocks and their axle being each arranged vertically. This apparatus, however, is of large size and requires frequent repairs and careful treatment.

According to the present invention the apparatus has only one forming block provided which, together with all the members relating thereto, does not move continuously in a circle but moves periodically upward and downward, the block being arranged horizontally, so that the working movement is the same as in the apparatus previously known.

The accompanying drawings illustrate a machine constructed according to the invention and in which:—

Figures 1, 7, 9 and 10 are side elevations of the machine, partly in section, which show the block in various positions corresponding to different phases of bending the box;

Fig. 2 represents a blank;

Fig. 3 is a sectional view on the line $a$ $b$ of Fig. 4;

Figure 7:
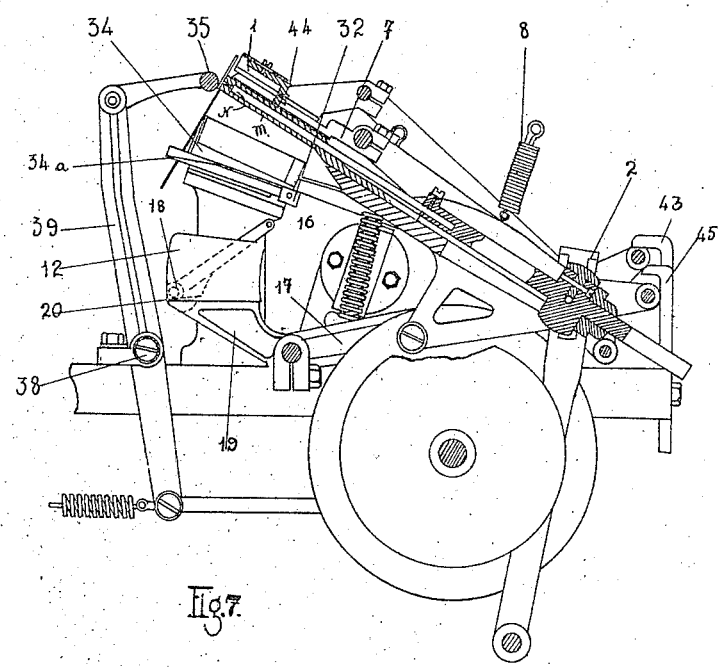
Figure 8:
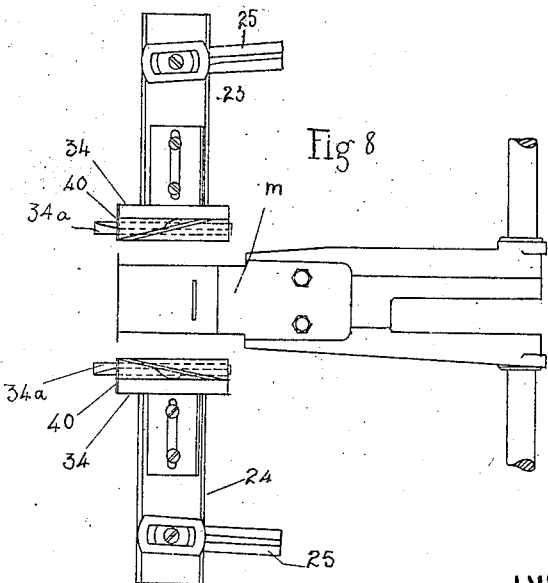
Figure 9:
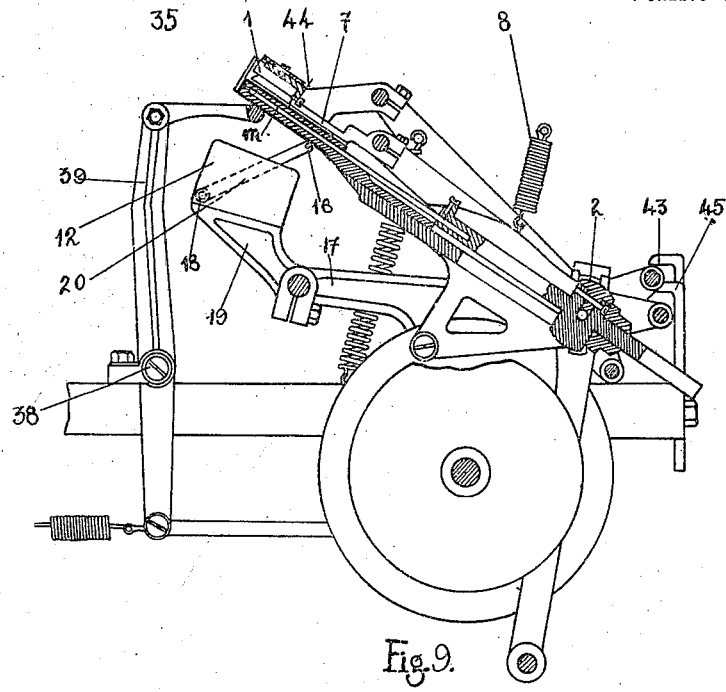
Figure 10:
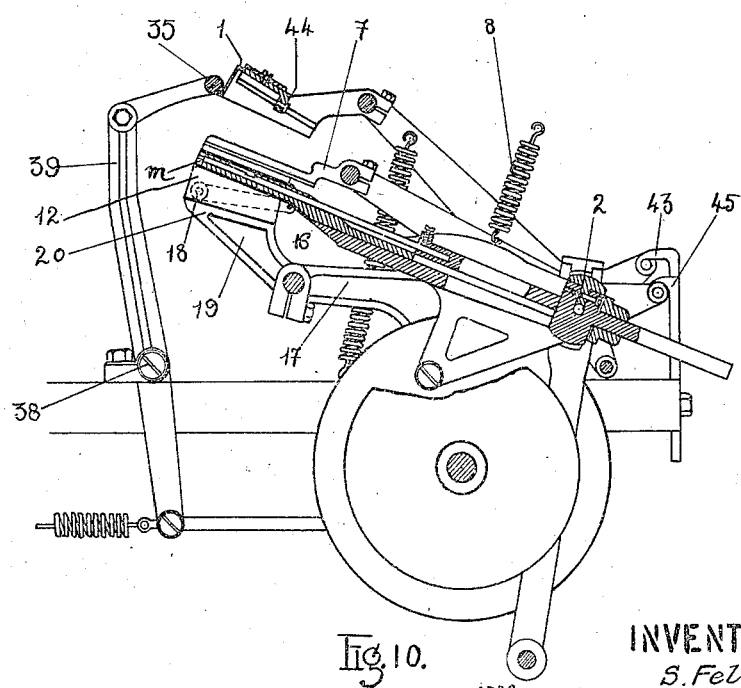

Fig. 3$^a$ shows a blank with bent edges and tongues;

Fig. 4 is a plan view of the appliance in the position shown in Fig. 1;

Fig. 5 is a plan view of the appliance shown in the position intermediate between the positions shown in Figs. 1 and 7;

Fig. 6 shows a blank with tongues $c$ and $c'$, bent more than in Fig. 3$^a$;

Fig. 8 is a plan view of the appliance in the position shown in Fig. 7;

Fig. 9$^a$ shows a blank with a slit in the position of the appliance shown in Fig. 9;

Fig. 11 is a sectional view on the line K Z of Fig. 10 viewed in the direction of the arrow.

Fig. 1 shows the entire appliance with the blank laid in before beginning the operation and Fig. 2 represents, as stated above, a prepared blank or packing consisting of side surfaces $a$ and $k$, a tongue $n$ and narrow sides and ends $b$, $b'$, $d$, $m$, $e$, $e'$, and of inner tongues $c$ and $c'$, and $l$, $l'$. The blank receives at the first operation a form shown in Fig. 3$^a$, where the surfaces $b$, $b'$ are bent to 90° together with tongues $c$, $c'$. During subsequent movements these tongues are again bent through 90° after which the part $k$ is bent to the part $a$ so that the parts $e$, $e'$ fit against parts $b$, $b'$. Then the parts $e$, $e'$, together with the tongues $l$, $l'$ are bent. All these operations are effected by the present invention as follows:—

The blank is placed in the machine in the direction of the arrow (Fig. 1) and abuts against the stop 32 (Figs. 1 and 7) moving between angle pieces 34$^a$ of the rods 34 (Figs. 1, 3 and 4).

When the machine rotates on the axle 2 the forming block M approaches the blank $a$ (Figs. 3 and 4) while on the other side of the blank, there are arranged fingers 7 which by means of spring 8, are adapted to press upon the blank.

The block M moving upward the pressing fingers 7 meet the block and retaining the blank, bend it by means of the rods 34 which are arranged according to the size of the block. On further movement, the parts $b$, $b'$ and the tongues $c$, $c'$ are bent to the corresponding edges of the block M so that the parts assume the position shown in Fig. 3$^a$.

When the block M arrives in the position shown in Fig. 3 in dotted lines, the rods 34 come together and the angles 40 (Fig. 5) bend the tongues $c$, $c'$ to 90° in the vertical direction and the blank receives the form as shown in Fig. 6.

On the further movement of the block M upward, it enters together with the blank bent at its sides into the box-shaped pressing device 1, where the blank begins to bend through 90° (Fig. 7) so that the part $d$ covers the bent tongues $c$, $c'$ and keeps them in their position.

Moving farther upward the block M meets the roller 35 which, under the action of the lever 39 mounted on the pin 38, moves forward and presses the blank to the block M whereby the end of the blank lies on the part N of the block (Fig. 9).

Just after the meeting of the block M with the roller 35 a keeper arm 16 begins to move which, by means of levers 17, 19, is rotated on the pin 18 (Fig. 9) under the action of the spring 20. This arm 16 presses the end n of the blank, keeping it in position during the further operations.

When moving back downwardly the block M begins to enter into the presser 12 (Figs. 10 and 11).

The presser is shown in Fig. 11 in cross section and consists of a body 12 having two plates provided with flat springs 42.

When the block M approaches the presser 12, the pressing part 1 bearing against the stop 43 remains at rest and leaves the block M, the blank being kept on the block M by the keeper 16 and fingers 7 and 8.

The body 12 with plates 42 accomplishes the bending of the edges e, e' while the springs 42 insure the correct alinement of the edges e, e' with the edges b, b'.

Fig. 10 shows a position in which the block M has entered into the presser 12, while the pressing part 1 is free from the block, and the fingers 7 by bearing against the stop 45, also are freed from the block.

The operation of the rods 34 for bending the tongues c c' is effected by means of displacing slides 23, 23 which are actuated by levers 25 (Fig. 5).

At the moment when the blank comes into contact with the part 1 affixed on the latter the cross cutter 44 makes a slit p in the blank (Figs. 7 and 9ᵃ). This slitting during the making of the box insures its correct position so that the tongue fits in correctly.

Having now described my invention, what I claim as new and desire to secure by Letters Patent is:—

1. Apparatus for the purpose described comprising in combination, a forming block, means for feeding a blank thereto, means for moving the block upwardly to form the sides, and a pressing device the front side of which co-acts with the further upwardly moving block to bend the blank through 90°.

2. Apparatus for the purpose described, comprising in combination, a forming block adapted to be vertically reciprocated, means for feeding a blank thereto, devices co-acting with the moving block to bend the edges of the blank, a pressing device one end of which co-acts with the upwardly moving block to bend the blank through 90°, and means for cutting a slit in the blank for the purpose described.

In testimony whereof I have signed my name to this specification in the presence of two subscribing witnesses.

SHIMON FELDMAN.

Witnesses:
BOROS MAFSOR,
MOSES LURATAUSA.

Copies of this patent may be obtained for five cents each, by addressing the "Commissioner of Patents, Washington, D. C."